(12) United States Patent  
DeLuca et al.

(10) Patent No.: US 9,009,238 B2
(45) Date of Patent: Apr. 14, 2015

(54) MIRRORING MESSAGING STATUS

(75) Inventors: Lisa Seacat DeLuca, San Francisco, CA (US); Steven Michael Miller, Cary, NC (US); Pamela Ann Nesbitt, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/955,402

(22) Filed: Nov. 29, 2010

(65) Prior Publication Data

US 2012/0136932 A1    May 31, 2012

(51) Int. Cl.
G06F 15/16    (2006.01)
H04L 12/64    (2006.01)
G06Q 10/10    (2012.01)

(52) U.S. Cl.
CPC ............ H04L 12/6418 (2013.01); G06Q 10/10 (2013.01)

(58) Field of Classification Search
USPC ................................................. 709/204–207
See application file for complete search history.

(56) References Cited

U.S. PATENT DOCUMENTS

| | | | |
|---|---|---|---|
| 7,263,545 B2 * | 8/2007 | Digate et al. .................. | 709/206 |
| 7,299,263 B2 | 11/2007 | Claudatos et al. | |
| 7,596,599 B1 * | 9/2009 | Maghsoodnia et al. ...... | 709/206 |
| 7,606,862 B2 | 10/2009 | Swearingen et al. | |
| 7,606,866 B2 | 10/2009 | Mora | |
| 7,676,690 B2 | 3/2010 | Bucher et al. | |
| 7,743,099 B2 | 6/2010 | Szeto | |
| 2004/0153506 A1 * | 8/2004 | Ito et al. ........................ | 709/204 |
| 2004/0186887 A1 | 9/2004 | Galli et al. | |
| 2005/0223075 A1 * | 10/2005 | Swearingen et al. ......... | 709/207 |
| 2006/0242235 A1 * | 10/2006 | Classen et al. ................ | 709/204 |
| 2007/0061405 A1 | 3/2007 | Keohane et al. | |
| 2007/0198725 A1 * | 8/2007 | Morris .......................... | 709/227 |
| 2008/0208982 A1 | 8/2008 | Morris | |
| 2010/0088388 A1 * | 4/2010 | Donovan ....................... | 709/207 |
| 2010/0332647 A1 * | 12/2010 | Agulnik et al. ............... | 709/224 |

OTHER PUBLICATIONS

Jones, J., "Enactive Cognition, Cultural Values, and Communication Among Hyper-Reflexive, Non-Trivial Machines: A Systems Analysis of Internet-Mediated Dialogue", A dissertation presented to the faculty of Saybrook Graduate School and Research Center, pp. 1-207 (2003).

* cited by examiner

Primary Examiner — Ario Etienne
Assistant Examiner — Kidest Mendaye
(74) Attorney, Agent, or Firm — Holland & Knight LLP; Brian J. Colandreo, Esq.; Jeffrey T. Placker, Esq.

(57) ABSTRACT

A messaging status associated with a first user is determined. A messaging status associated with a second user is set based upon, at least in part, the determined messaging status associated with the first user.

18 Claims, 3 Drawing Sheets

MIRRORING MESSAGING STATUS

BACKGROUND OF THE INVENTION

This disclosure relates to messaging systems, and more particularly to controlling indicated user messaging status in messaging systems.

Instant messaging provides real-time text based communication between two or more users interacting via computers or mobile devices. The more immediate and direct interaction provided by instant messaging often tends to more closely resemble a conversation, as compared to the more "letter like" format of email. The direct interaction between users can provide highly effective and convenient collaboration. For example, problems of unanswered emails and unreturned phone messages can be avoided. Additionally, instant messaging allows people to instantly determine the availability of other user, e.g., for having a conversation, etc.

While instant messaging can be a very useful tool for communication and collaboration, there are times when a user does not wish to be bothered or interrupted. This convenience is provided by a "do not disturb" ("DND") feature in the instant messaging application. Similarly, other messaging status indicators, such as "offline," "in meeting," or the like, may be used to indicate an instant messaging user's availability for interaction.

BRIEF SUMMARY OF THE INVENTION

In a first implementation, a method includes determining, by a computing device, a messaging status associated with a first user. A messaging status of associated with a second user is set based upon, at least in part, the determined messaging status associated with the first user.

One or more of the following features may be included. Setting the messaging status associated with the second user based upon, at least in part, the determined messaging status associated with the first user may include setting the messaging status associated with the second user based upon, at least in part, one or more predefined preferences. Setting the messaging status associated with the second user based upon, at least in part, the determined messaging status associated with the first user may include setting the messaging status associated with the second user to the determined messaging status associated with the first user.

A common scheduling event associated with the first user and associated with the second user may be determined. The messaging status associated with the second user may be set based upon, at least in part, the determined common scheduling event associated with the first user and associated with the second user.

Setting the messaging status associated with the second user based upon, at least in part, the determined messaging status associated with the first user may include determining a proximity of the first user relative to the second user. The messaging status associated with the second user may be set based upon, at least in part, the determined messaging status associated with the first user if the determined proximity of the first user relative to the second user is within a predefined distance.

Setting the messaging status associated the second user may include setting a global messaging status associated with the second user. Setting the messaging status associated with the second user may include setting a messaging status specific to the first user.

According to another implementation, a computer program product includes a computer readable medium having a plurality of instructions stored on it. When executed by a processor, the instructions cause the processor to perform operations including determining a messaging status associated with a first user. The operations also include setting a messaging status associated with second user based upon, at least in part, the determined messaging status associated with the first user.

One or more of the following features may be included. The instructions for setting the messaging status associated with the second user based upon, at least in part, the determined messaging status associated with the first user may include instructions for setting the messaging status associated with the second user based upon, at least in part, one or more predefined preferences. The instructions for setting the messaging status associated with the second user based upon, at least in part, the determined messaging status associated with the first user may include instructions for setting the messaging status associated with the second user to the determined messaging status associated with the first user.

The computer program product may further include instructions for determining a common scheduling event associated with the first user and associated with the second user. The messaging status associated with the second user may be based upon, at least in part, the determined common scheduling event associated with the first user and associated with the second user.

The instructions for setting the messaging status associated with the second user based upon, at least in part, the determined messaging status associated with the first user may further include instructions for determining a proximity of the first user relative to the second user. The messaging status associated with the second user may be set based upon, at least in part, the determined messaging status associated with the first user if the determined proximity of the first user relative to the second user is within a predefined distance.

The instructions for setting the messaging status associated the second user may include instructions for setting a global messaging status associated with the second user. The instructions for setting the messaging status associated with the second user may include instructions for setting a messaging status specific to the first user.

According to yet another implementation, a system includes a processor and a memory coupled with the processor. A first software module is executable by the processor and the memory. The first software module is configured to determine a messaging status associated with a first user. A second software module is also executable by the processor and the memory. The second software module is configured to set a messaging status associated with second user based upon, at least in part, the determined messaging status associated with the first user.

One or more of the following features may be included. The second software module, configure to set the messaging status associated with the second user based upon, at least in part, the determined messaging status associated with the first user, may be configured to set the messaging status associated with the second user based upon, at least in part, one or more predefined preferences. The second software module, configured to set the messaging status associated with the second user based upon, at least in part, the determined messaging status associated with the first user, may be configured to set the messaging status associated with the second user to the determined messaging status associated with the first user.

The system may also include a third software module executable by the processor and the memory. The third software module may be configured to determine a common scheduling event associated with the first user and associated with the second user. A fourth software module may also be executable by the processor and the memory. The fourth software module may be configured to set the messaging status associated with the second user based upon, at least in part, the determined common scheduling event associated with the first user and associated with the second user.

The second software module, configured to set the messaging status associated with the second user based upon, at least in part, the determined messaging status associated with the first user, may be configured to determine a proximity of the first user relative to the second user. The second software module may also be configured to set the messaging status associated with the second user based upon, at least in part, the determined messaging status associated with the first user if the determined proximity of the first user relative to the second user is within a predefined distance.

The second software module, configured to set the messaging status associated the second user, may be configured to set a global messaging status associated with the second user. The second software module, configured to set the messaging status associated with the second user, may be configured to set a messaging status specific to the first user.

The details of one or more implementations are set forth in the accompanying drawings and the description below. Other features will become apparent from the description, the drawings, and the claims.

DETAILED DESCRIPTION OF THE INVENTION

Figure 1:
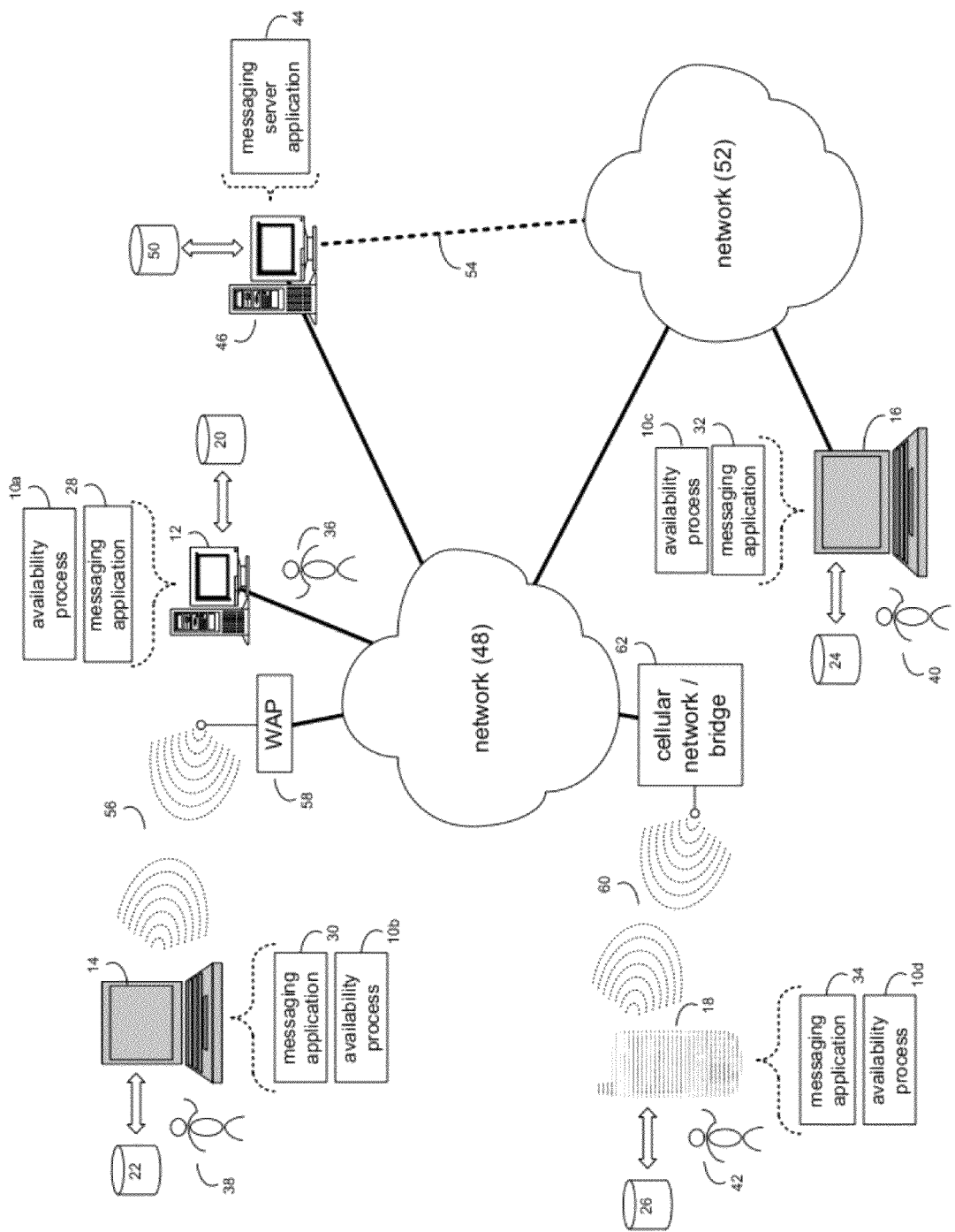
FIG. 1 diagrammatically depicts an availability process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown availability process 10a-10d that may reside on and may be executed by client electronic devices 12, 14, 16, 18. Examples of client electronic devices 12, 14, 16, 18 may include, but are not limited to, personal computer 12, laptop computer 14, data enabled cellular telephone 16, notebook computer 18, for example. Client electronic devices 12, 14, 16, 18 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both). The instruction sets and subroutines of availability process 10a-10d, which may be configured as one or more software modules, and which may be stored on storage device 20, 22, 24, 26 (respectively) coupled to client electronic device 12, 14, 16, 18 (respectively), may be executed by one or more processors (not shown) and one or more memory architectures (not shown) incorporated into client electronic device 12, 14, 16, 18 (respectively). Storage device 20, 22, 24, 26 may include, but are not limited to: hard disk drives; solid state drives, tape drives; optical drives; RAID arrays; random access memories (RAM); read-only memories (ROM), compact flash (CF) storage devices, secure digital (SD) storage devices, and memory stick storage devices.

As will be described in greater detail below, availability process 10a-10d may determine a messaging status associated with a first user. Availability process 10a-10d may also set a messaging status of associated with a second user based upon, at least in part, the determined messaging status associated with the first user.

In addition to availability process 10a-10d, client electronic devices 12, 14, 16, 18 may each execute a messaging application (e.g., messaging applications 28, 30, 32, 34), examples of which may include but are not limited to IBM Lotus Sametime™, Microsoft Office Communicator™, Google Talk™, and AOL Instant Messenger™, for example. Additionally, one or more of messaging applications 28, 30, 32, 34 may be a feature of a social networking application/website. In such an example, one or more of messaging application 28, 30, 32, 34 may include a web browser that allows access to the social networking application/website. Availability process 10a-10d may be a stand alone application that interfaces with the respective messaging application 28, 30, 32, 34, and/or may be an applet/application that is executed within messaging application 28, 30, 32, 34, a module of messaging application 28, 30, 32, 34, or the like.

Using messaging applications 28, 30, 32, 34, one or more users (e.g., users 36, 38, 40, 42) may access messaging server application 44, examples of which may include, but are not limited to IBM Lotus Sametime™, Microsoft Office Live Communications Server™, Jabber XCP™, and AOL Instant Messenger™. Additionally, messaging server application may include a social networking application or website. Messaging server application 44 may route messages to messaging client applications, e.g., messaging client applications 28, 30, 32, 34, thereby allowing users 36, 38, 40, 42 to engage in various messaging interactions.

Messaging server application may be executed by server computer 46, which may be connected to network 48 (e.g., the Internet or a local area network). Examples of server computer 46 may include, but are not limited to: a personal computer, a server computer, a series of server computers, a mini computer, and a mainframe computer. Server computer 46 may be a web server (or a series of servers) running a network operating system, examples of which may include but are not limited to: Microsoft® Windows® XP Server; Novell® NetWare®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

The instruction sets and subroutines of messaging server application 44, which may include one or more software modules and which may be stored on storage device 50 coupled to server computer 46, may be executed by one or more processors (not shown) and one or more memory architectures (not shown) incorporated into server computer 46. Storage device 50 may include but is not limited to: a hard disk drive; a solid state drive; a tape drive; an optical drive; a RAID array; a random access memory (RAM); and a read-only memory (ROM).

Server computer 46 may execute a web server application, examples of which may include but are not limited to: Microsoft IIS, Novell Webserver™, or Apache® Webserver, that allows for HTTP (i.e., HyperText Transfer Protocol) access to server computer 46 via network 48 (Webserver is a trademark of Novell Corporation in the United States, other countries, or both; and Apache is a registered trademark of Apache Software Foundation in the United States, other Countries, or both). Network 48 may be connected to one or more secondary networks (e.g., network 52), examples of which may include but are not limited to: a local area network; a wide area network; or an intranet, for example.

In addition/as an alternative to being a client-based application residing on server client electronic devices 12, 14, 16, 18, the availability process may be a server-side application (not shown) residing on server computer 46 (e.g., stored on storage device 50, and executed by a processor (not shown) and memory architecture (not shown) incorporated into server computer 46. The server-side availability process may be a stand alone application that interfaces with a messaging server application (e.g., messaging server application 44), or may be an applet/application that is executed within a messaging server application. As such, the availability process may be a client-side application, a server-based application, or a hybrid client-side/server-based application, which may be executed, in whole or in part, by server computer 46, and/or one or more of client electronic device (e.g., client electronic devices 12, 14, 16, 18).

Users 36, 38, 40, 42 may access messaging server application 44 directly through the device on which the messaging application (e.g., messaging applications 28, 30, 32, 34) is executed, namely client electronic devices 12, 14, 16, 18, for example. Users 36, 38, 40, 42 may access messaging server application 44 directly through network 48 or through secondary network 52. Further, server computer 46 (i.e., the computer that executes messaging server application 44) may be connected to network 48 through secondary network 52, as illustrated with phantom link line 54.

The various client electronic devices may be directly or indirectly coupled to network 48 (or network 52). For example, personal computer 12 is shown directly coupled to network 48 via a hardwired network connection. Further, notebook computer 14 is shown directly coupled to network 52 via a hardwired network connection. Laptop computer 16 is shown wirelessly coupled to network 48 via wireless communication channel 56 established between laptop computer 16 and wireless access point (i.e., WAP) 58, which is shown directly coupled to network 48. WAP 58 may be, for example, an IEEE 802.11a, 802.11b, 802.11g, Wi-Fi, and/or Bluetooth device that is capable of establishing wireless communication channel 56 between laptop computer 16 and WAP 58. Data enabled cellular telephone 18 is shown wirelessly coupled to network 48 via wireless communication channel 60 established between data enabled cellular telephone 18 and cellular network/bridge 62, which is shown directly coupled to network 48.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the purpose of the following description, messaging application 28 may be discussed. However, this is for illustrative purposes only and should not be construed as a limitation of the present disclosure, as other messaging applications (e.g., messaging applications 30, 32, 34) may be equally utilized.

Figure 2:
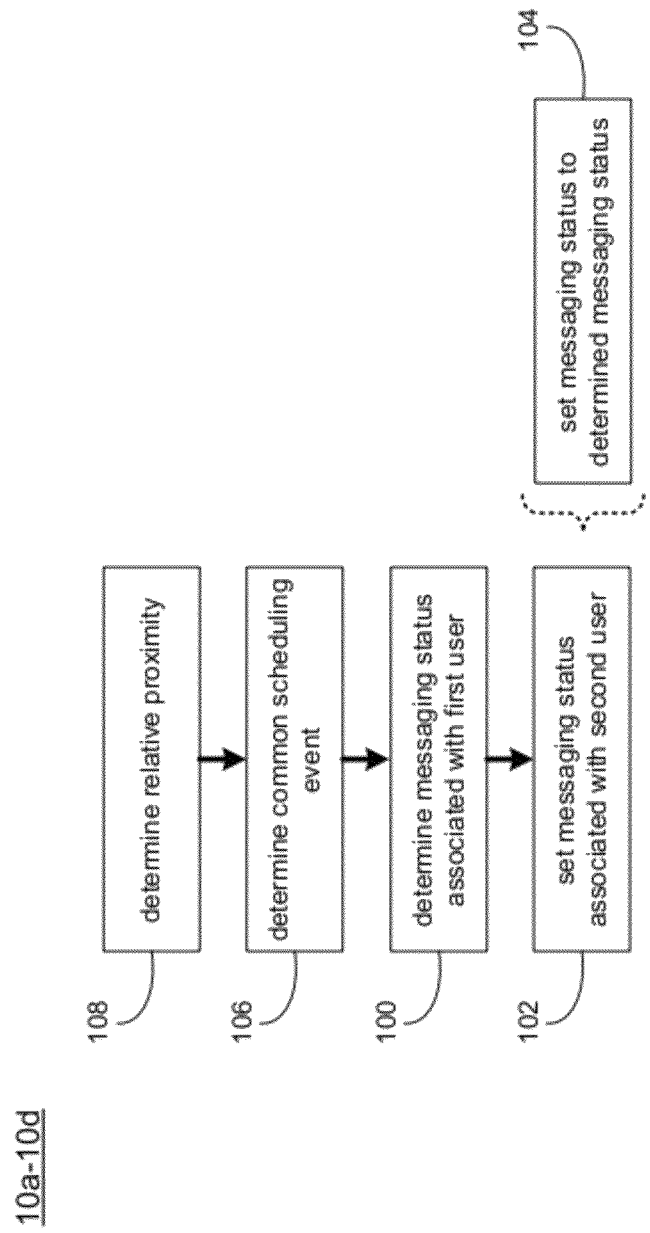
FIG. 2 is a flowchart of a process executed by the availability process of FIG. 1.

Referring also to FIG. 2, availability process 10a generally may determine 100 a messaging status associated with a first user. Availability process 10a may also set 102 a messaging status associated with a second user based upon, at least in part, the determined 100 messaging status associated with the first user. As used herein, messaging status may include one or more of a messaging status availability status (e.g., "busy," "online," "offline," etc.) and a messaging status message, e.g., which may include a user created message (e.g., "I am at lunch until 1 pm," etc.).

Assume, for example, that user 36 is extremely busy, and would generally not wish to be disturbed. User 36 may thus set her messaging status in a messaging application (e.g., messaging application 28), such as an instant messaging client, to "busy," to avoid interruptions. While user 36 would generally prefer not to be disturbed, user 36 may wish to allow user 38 to contact her. However, user 38 may currently be "offline," and therefore not available for interactions (e.g., "chatting"). As such, user 36's "busy" messaging status may currently be of little consequence in terms of chatting with user 38. Once user 38 is again available for messaging, user 38 may be inclined to respect user 36's "busy" status, and not message user 36, contrary to user 36's desire to be available for user 38. User 36 may, therefore, wish to have her messaging status change once user 38 is available.

In the foregoing example, availability process 10a, executing on client electronic device 12, associated with user 36, may determine 100 a messaging status associated with a first user (e.g., user 38). For example, availability process 100 (alone and/or in conjunction with one or more of messaging application 28 and messaging server application 44) may determine a messaging status associated with user 38. For example, user 38 may be included within a buddy list for user 36 (e.g., which may be maintained by messaging application 28). Messaging application 28 may periodically request a messaging status for those individuals included within user 36's buddy list (e.g., including user 38). Availability process 10a (alone and/or in combination with one or more of messaging application 28 and messaging server application 44) may, therefore, determine 100 a messaging status associated with user 38. Additionally/alternatively, availability process 10a (alone and/or in conjunction with one or more of messaging application 28 and messaging server application 44) may periodically transmit a query (e.g., to one or more of messaging server application 44 and messaging application 34 associated with user 38) requesting a messaging status of user 38. Similarly, messaging application 30 may periodically transmit a messaging status associated with user 38 (e.g., to messaging server application 44, and/or to messaging application 28). The transmitted messaging status associated with user 38 may be forwarded to, or retrieved by availability process 10a (alone and/or in conjunction with one or more of messaging application 28 and messaging server application 44). It will be appreciated that availability process 10a may utilize various additional/alternative mechanisms for determining 100 the availability associated with a first user (e.g., user 38 in the above-stated example).

Availability process 10a may also set 102 a messaging status associated with a second user (e.g., user 36 in the above-stated example) based upon, at least in part, the determined 100 messaging status associated with the first user (e.g., user 38 in the above-stated example). Continuing with the above-stated example, user 36 has set a messaging status of "busy," but wishes to be in an "available" status when user 38 (who is currently in an "offline" messaging status) is available. Accordingly, user 38 may become available and set (e.g., via messaging application 30) his messaging status to "online." Availability process 10a may determine 100 the "online" messaging status associated with user 38, as discussed above. Upon determining 100 user 38's "online" status, availability process 10 may set 102 a messaging status associated with user 36 to "online." That is, availability process 10a may change user 36's messaging status from "busy" to online. In this manner, user 38 may see user 36 as being available to chat (e.g., which may be indicated in user 38's buddy list (which may be shown via messaging application 30).

In a related manner, user 38 may at a later time return to an "offline" messaging status. Availability process 10a may determine 100 (as discussed above) the change in messaging status associated with user 38. Availability process 10a (alone and/or in conjunction with one or more of messaging application 28 and messaging server application 44) may further set 102 the messaging status of user 36 to "busy" based upon, at least in part, the determined 100 messaging status associated with user 38. In the foregoing manner, user 36 may have an indicated messaging status of "online" (e.g., available to chat) when user 38 is similarly available, and may have a messaging status of "busy" when user 38 is not available to chat.

While the foregoing example involved setting 102 an "online" (e.g., available to chat) messaging status associated with user 36 based upon, at least in part, a determined 100 "online" messaging status associated with user 38, it should be appreciated that various additional/alternative messaging available statuses may be set. For example, a user (e.g., user 36) may feel that messaging with another user (e.g., user 40) may often be a great time draw for relatively little value. Therefore, while user 36 may generally want to be available for messaging (e.g., by setting a messaging status of "online"), user 36 may wish to have her messaging status changed to "busy" whenever user 40 is online, thereby preventing/reducing the likelihood of receiving messages from user 40. In such an example, availability process 10a may determine 100 a messaging status associated with user 40 as being "offline" while user 36 has an associated messaging status set to "online." Subsequently, availability process 10a may determined 100 that user 40 has changed his messaging status to "online." Based upon, at least in part, the determined 100 messaging status of "online" associated with user 40, availability process 10a (alone and/or in conjunction with one or more of messaging application 28 and messaging server application 44) may set 102 a messaging status of "busy" associated with user 36. Accordingly, upon coming online, user 40 may see (e.g., in a buddy list maintained by messaging application 32) a messaging status of "busy" associated with user 36. User 40 may, therefore, be prevented and/or deterred from attempting to message user 36.

It will be appreciated that many additional/alternative combinations of determined 100 messaging statuses of a first user, and set 102 messaging statuses of the second user, based upon at least in part the determined 100 messaging status of the first user, may be utilized. Further, the messaging status of the second user may be set 102 based upon, at least in part, determined 100 messaging statuses of N other users. For example, availability process 10a may set 102 an "online" messaging status associated with the second user based upon, at least in part, a determined "online" messaging status associated with a first user. Availability process 10a may set 102 a "busy" messaging status associated with an unavailable (e.g., "offline," "busy," etc.) messaging status associated with the second user. Further, availability process 10a may set 102 a messaging status of "busy" associated with the second user based upon, at least in part, a determined 102 "online" messaging status associated with a third user. Various additional examples will be appreciated.

In regard to the various messaging statuses that may be set 102 associated with the second user in response to various determined 100 messaging statuses associated with the first user, setting 102 the messaging status associated with the second user based upon, at least in part, the determined 100 messaging status associated with the first user may include setting 102 the messaging status associated with the second user based upon, at least in part, one or more predefined preferences.

Figure 3:
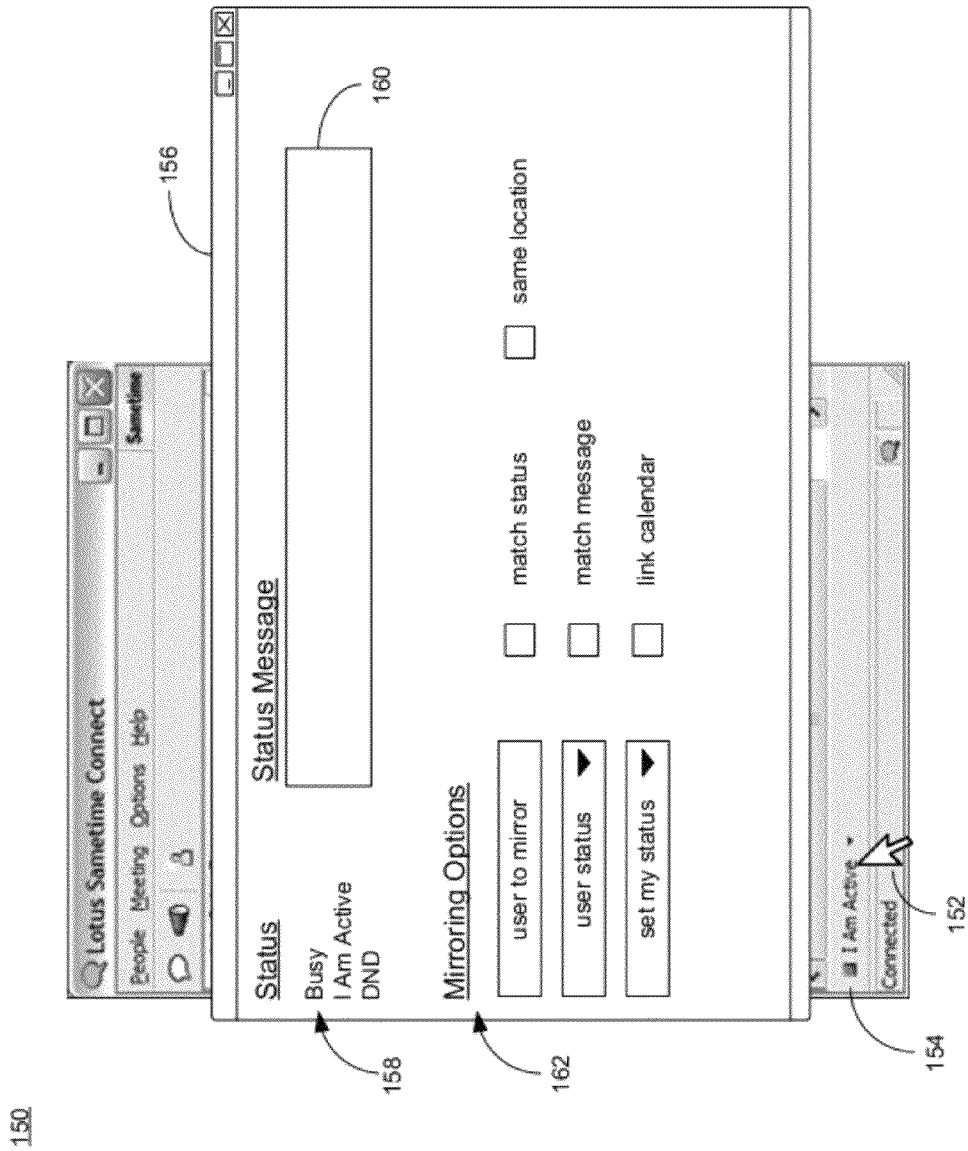
FIG. 3 depicts a user interface that may be rendered by the availability process or a messaging application of FIG. 1.

For example, and referring also to FIG. 3, the availability process (e.g., availability process 10a) may allow a user (e.g., user 36) to define various preferences via a user interface (e.g., user interface 150) of a messaging application (e.g., messaging application 28). In an embodiment, user 36 may select, via onscreen pointer 152 (which may be controlled by a pointing device such as a mouse; not shown) current status 154, e.g., by right-clicking on status option 154. Selecting status option 154 may result in availability process 10a and/or messaging application 28 rendering preferences dialog box 156. Dialog box 156 may include one or more messaging status options 158 (e.g., "busy," "I am active," etc.), status message input box 160 (e.g., which may allow user 36 to generate a custom messaging status indicator/message), and mirroring options 162. Availability process 10a (alone and/or in conjunction with one or more of messaging application 28 and messaging server application 44) may allow user 36 to define one or more mirroring preferences (i.e., preferences for setting 102 a messaging status associated with user 36 based upon, at least in part, a determined 100 messaging status associated with another user).

As shown, mirroring options 162 may allow user 36 to set various preferences with regard to mirroring a messaging status of another user. For example, user 36 may input (e.g. via drop-down menus, text input using a keyboard, and/or check-boxes) the identity of a user whose messaging status user 36 wished to mirror (e.g., by inputting the other user's messaging username). Additionally, user 36 may, for example, elect to match the identified user's status and/or message. Further, user 36 may set preferences for matching the identified user's status and/or message. User 36 may additionally/alternatively identify a status to be set for a given status of the identified user. Additionally, a messaging status may be linked to a calendaring event and/or location based settings. Various combination of the preferences may be defined. Further, it should be appreciated that foregoing examples regarding mirroring options are intended for illustrative purposes only and should not be construed as a limitation of the present disclosure. The number and nature of preferences that may be defined, as well as the manner of defining preferences may vary depending upon design criteria and user need.

Setting 102 the messaging status associated with the second user based upon, at least in part, the determined 100 messaging status associated with the first user may include setting 104 the messaging status associated with the second user to the determined 100 messaging status associated with the first user. For example, as discussed above with regards to the various preferences that may be established, a user (e.g., user 36) may select to have her status set to the status of the first user (e.g., user 38). Accordingly, when availability process 10a determines 100 an "offline" messaging status associated with user 38, availability process 10a may set an "offline" messaging status associated with user 36. Similarly, when availability process 10a determines 100 an "online" messaging status associated with user 38, availability process 10a may set 102 an "online" messaging status associated with user 36. Similar processes may be provided for other messaging statuses. Additionally, and as also generally discussed above, in addition to merely setting 102 a messaging status associated with user 36 to the determined 100 messaging status associated with user 38, availability process 10a may set 102 a messaging status message (e.g., "I am in a meeting until 4 pm") associated with user 36 based upon, at least in part, determining 100 a messaging status of "I am in a meeting until 4 pm" associated with user 38. The messaging status message "I am in a meeting until 4 pm" may be accompanied by a messaging status availability status, such as "busy." Various additional messaging status messages may similarly be set.

A common scheduling event associated with the first user and associated with the second user may be determined 106. The messaging status associated with the second user may be set 102 based upon, at least in part, the determined 106 common scheduling event associated with the first user and associated with the second user. As discussed above, availability process 10a may set 102 a messaging status associated with a second user (e.g., user 36) to a determined 100 messaging status associated with a first user. In part, this may based upon a common calendaring/scheduling event associated with the first user and associated with a second user. For example, availability process 10a may determine 106 a common scheduling event associated with the first user (e.g., user 38) and associated with the second user (e.g., user 36). In one embodiment, availability process 10 may access a calendaring/scheduling application (not shown) associated with use 36. The calendaring/scheduling application may reside on client electronic device 12 and/or may reside on server computer 46, for example, although other configurations are equally contemplated. Availability process 10a may determine 106 that user 36 has a meeting scheduled for a given time period (e.g., from 2 pm until 4 pm). Availability process 10a may further determine 106 that user 38 is indicated as being party to the meeting (e.g., as being an invitee to the meeting). Accordingly, availability process 10a may determined 106 a common scheduling event associated with user 36 and associated with user 38. Based upon, at least in part, the determined 106 common scheduling event (e.g., possibly also based upon predefined preferences), availability process 10a may set 102 a messaging status for user 36 to the messaging status determined 100 for user 38 during the time period of the common scheduling event. Setting 102 a messaging status in this manner may, for example, be based upon, at least in part, a belief by user 36 (and corresponding preference set by user 36) that any messaging status set by user 38 for this common scheduling event may be equally applicable to user 36. As such, availability process 10*a* may determine 106 a common scheduling event associated with user 36 and associated with user 38. Availability process 10*a* may further determine a messaging status associated with user 38 (e.g., "I am in a meeting until 4 pm"). Based upon, at least in part, the determined 106 common scheduling event and the determined 100 messaging status associated with user 38, availability process 10*a* may set 102 a messaging status of "I am in a meeting until 4 pm" associated with user 36.

According to a further aspect, the availability process may set 102 the messaging status associated with the second user including determining 108 a proximity of the first user relative to the second user. In such an embodiment, the availability process may set 102 the messaging status associated with the second user based upon, at least in part, the determined 100 messaging status associated with the first user if the determined 108 proximity of the first user relative to the second user is within a predetermined distance. For example, as discussed above, messaging application 34 may be executed by a data enabled cellular telephone 18. As is known, such messaging applications (alone, and/or in conjunction with other applications, such as global positioning satellite, GPS, location applications) may be capable of determining a location of the device (e.g., the location of data enabled cellular telephone 18). Such location information may be indicated by messaging application 34. Similarly, the location of other messaging users may similarly be indicated by respective messaging applications if such location information is available.

Continuing with the above aspect, user 34 may be at a football game with a friend "Tom," who may also have a mobile device executing a messaging application capable of indicating the location of the mobile device (and therein, by inference, the location of Tom). Availability process 10*d* (executed by client electronic device 18) may (alone and/or in conjunction with one or more of messaging application 34 and other location applications) may determine 108 a location of Tom relative to user 42. Availability process 10*d* may determine that Tom is within a predetermined distance of user 42 (e.g., with 50 feet, or any other desired proximity). Further, availability process 10*d* may determine a messaging status associated with Tom (e.g., the message "I'm at the football game"). The messaging status associated with Tom may also include an availability status (e.g., "offline") along with the status message "I'm at the football game." Further, as availability process 10*d* has determined 108 that Tom is within a predetermined distance of user 42, availability process 10*d* may set 102 a messaging status associated with user 42 based upon, at least in part, the messaging status associated with Tom. For example, availability process 10*d* may set 102 the messaging status associated with user 42 to "I'm at the football game." In a similar manner, availability process 10*d* may determine a messaging status associated with a plurality of messaging users within a predetermined distance of user 42 (e.g., assumed to be at the location of client electronic device 18). Availability process 10*d* may determine a messaging status associated with the plurality of users. If a relatively large number of the plurality of users within the predetermined distance of user 42 have the same, or similar messaging status (e.g., "I'm at the football game"), availability process 10*d* may set a messaging status for user 42 based upon the determined messaging status of the relatively large number of the plurality of users. For example, availability process may set a messaging status associated with user 42 to "I'm at the football game," consistent with the foregoing scenario.

Setting 102 the messaging status associated the second user may include setting 102 a global messaging status associated with the second user. In such an embodiment, the messaging status associated with the second user may be a messaging status that is indicated to all other messaging users. Additionally/alternatively, setting 102 the messaging status associated with the second user may include setting a messaging status specific to the first user. For example, the messaging status set by the second user may continue to be indicated to all other messaging users, however, the messaging status of the second user set 102 based upon, at least in part, the determined 100 messaging status of the first user may be indicated to the first user, and/or to a predefined subset of messaging users.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer implemented method comprising:
setting, by a computing device, a first messaging status associated with a second user, wherein the first messaging status associated with the second user is viewable by a first set of predefined users;
determining, by the computing device, a messaging status associated with a first user; and
setting, by the computing device, a second messaging status associated with the second user based upon, at least in part, the determined messaging status associated with the first user including:
determining a proximity of the first user relative to the second user; and
setting the second messaging status associated with the second user based upon, at least in part, the determined messaging status associated with the first user if the determined proximity of the first user relative to the second user is within a predefined distance, wherein the second messaging status associated with the second user is set with text included within the determined messaging status associated with the first user, wherein the second messaging status associated with the second user is viewable by a second set of predefined users while the first messaging status associated with the second user remains viewable by the first set of predefined users.

2. The computer implemented method of claim 1, wherein setting the second messaging status associated with the second user based upon, at least in part, the determined messaging status associated with the first user further includes setting the second messaging status associated with the second user based upon, at least in part, one or more predefined preferences.

3. The computer implemented method of claim 1, wherein setting the second messaging status associated with the second user based upon, at least in part, the determined messaging status associated with the first user includes setting the second messaging status associated with the second user to the determined messaging status associated with the first user.

4. The computer implemented method of claim 1, further comprising:
determining a common scheduling event associated with the first user and associated with the second user; and
setting the second messaging status associated with the second user based upon, at least in part, the determined common scheduling event associated with the first user and associated with the second user.

5. The computer implemented method of claim 1, wherein setting the second messaging status associated the second user includes setting a global messaging status associated with the second user.

6. The computer implemented method of claim 1, wherein setting the second messaging status associated with the second user includes setting a messaging status specific to the first user.

7. A computer program product comprising a non-transitory computer readable medium having a plurality of instructions stored thereon, when executed by a processor, cause the processor to perform operations comprising:
setting a first messaging status associated with a second user, wherein the first messaging status associated with the second user is viewable by a first set of predefined users;
determining a messaging status associated with a first user; and
setting a second messaging status associated with the second user based upon, at least in part, the determined messaging status associated with the first user including:
determining a proximity of the first user relative to the second user; and
setting the second messaging status associated with the second user based upon, at least in part, the determined messaging status associated with the first user if the determined proximity of the first user relative to the second user is within a predefined distance, wherein the second messaging status associated with the second user is set with text included within the determined messaging status associated with the first user, wherein the second messaging status associated with the second user is viewable by a second set of predefined users while the first messaging status associated with the second user remains viewable by the first set of predefined users.

8. The computer program product of claim 7, wherein the instructions for setting the second messaging status associated with the second user based upon, at least in part, the determined messaging status associated with the first user further include instructions for setting the second messaging status associated with the second user based upon, at least in part, one or more predefined preferences.

9. The computer program product of claim 7, wherein the instructions for setting the second messaging status associated with the second user based upon, at least in part, the determined messaging status associated with the first user include instructions for setting the second messaging status associated with the second user to the determined messaging status associated with the first user.

10. The computer program product of claim 7, further comprising instructions for:
determining a common scheduling event associated with the first user and associated with the second user; and
setting the second messaging status associated with the second user based upon, at least in part, the determined common scheduling event associated with the first user and associated with the second user.

11. The computer program product of claim 7, wherein the instructions for setting the second messaging status associated the second user include instructions for setting a global messaging status associated with the second user.

12. The computer program product of claim 7, wherein the instructions for setting the second messaging status associated with the second user include instructions for setting a messaging status specific to the first user.

13. A system comprising:
a processor;
a memory coupled with the processor;
a first software module executable by the processor and the memory, the first software module configured to set a first messaging status associated with a second user, wherein the first messaging status associated with the second user is viewable by a first set of predefined users;
a second software module executable by the processor and the memory, the second software module configured to determine a messaging status associated with a first user; and
a third software module executable by the processor and the memory, the third software module configured to set a second messaging status associated with the second user based upon, at least in part, the determined messaging status associated with the first user including:
determining a proximity of the first user relative to the second user; and setting the second messaging status associated with the second user based upon, at least in part, the determined messaging status associated with the first user if the determined proximity of the first user relative to the second user is within a predefined distance, wherein setting the second messaging status associated with the second user is set with text included within the determined messaging status associated with the first user, wherein the second messaging status associated with the second user is viewable by a second set of predefined users while the first messaging status associated with the second user remains viewable by the first set of predefined users.

14. The system of claim 13, wherein the third software module, configure to set the second messaging status associated with the second user based upon, at least in part, the determined messaging status associated with the first user, is further configured to set the second messaging status associated with the second user based upon, at least in part, one or more predefined preferences.

15. The system of claim 13, wherein the third software module, configured to set the second messaging status associated with the second user based upon, at least in part, the determined messaging status associated with the first user, is further configured to set the second messaging status associated with the second user to the determined messaging status associated with the first user.

16. The system of claim 13, further comprising:
a fourth software module executable by the processor and the memory, the fourth software module configured to determine a common scheduling event associated with the first user and associated with the second user; and
a fifth software module executable by the processor and the memory, the fifth software module configured to set the second messaging status associated with the second user based upon, at least in part, the determined common scheduling event associated with the first user and associated with the second user.

17. The system of claim 13, wherein the third software module, configured to set the second messaging status associated the second user, is configured to set a global messaging status associated with the second user.

18. The system of claim 13, wherein the third software module, configured to set the second messaging status associated with the second user, is configured to set a messaging status specific to the first user.

* * * * *